Nov. 26, 1957  S. P. MARCOLONGO  2,814,460
HOSE GUIDE FOR AUTOMOBILES
Filed Sept. 29, 1955

Inventor:
Samuel P. Marcolongo,
by Robert D. Thomson
Attorney

United States Patent Office 2,814,460
Patented Nov. 26, 1957

2,814,460
HOSE GUIDE FOR AUTOMOBILES

Samuel P. Marcolongo, Stoneham, Mass.

Application September 29, 1955, Serial No. 537,536

3 Claims. (Cl. 254—190)

This invention relates to devices for guiding a hose or extension cord around an automobile tire in such a manner as to prevent the hose or cord from jamming under the tire.

In washing an automobile, the hose tends to wedge itself under the tires as the user moves around the car. The jamming of the hose in this manner not only prevents the user from pulling it along freely to maintain the desired slack, but is likely to collapse the hose and shut off the flow of water. An electric extension cord, used for example with an electric buffer, is likely to become jammed under the tires in the same manner, and the user often has to interrupt his work to untangle the cord.

The chief object of this invention is to produce a device which can readily be engaged with an automobile tire and prevents a hose or cord from jamming when passed around the tire. Other objects are to provide a device for this purpose which will fit most of the sizes of tires commonly used for automobiles and trucks, which may be quickly installed and removed without tools, which does not damage the tire, which can be stored in a small space, and which may be manufactured sufficiently cheaply so that the average car owner can afford to buy a set of four for his automobile.

In the drawings illustrating the invention,

Figure 3:
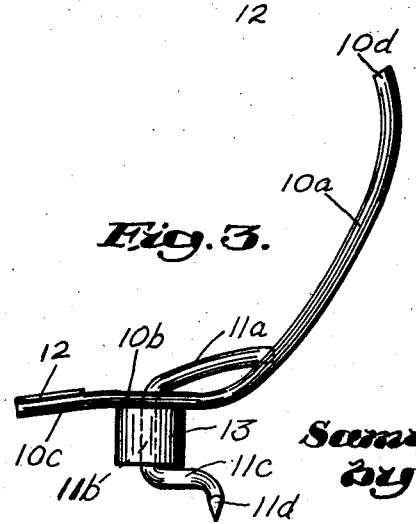
Fig. 3 is a side view of the hose guide.

The device consists of four parts, a bent piece of metal rod, a roller bracket 11, also made of metal rod, welded to rod 10, a flat metal plate 12, and a roller 13 which may be made of metal, wood or plastic. As seen in Fig. 3, rod 10 has an upwardly curved portion 10a, a horizontal intermediate portion 10b, a downwardly sloping end portion 10c, and an inwardly curved upper end portion 10d. The bracket 11 is somewhat U-shaped and has an upper leg 11a which bridges the bend of rod 10 between portion 10a and 10b, a substantially vertical intermediate part 11b, a lower leg 11c, and a downturned lower end forming a prong 11d. The roller 13 is mounted on part 11b, and is confined between leg 11c of bracket 11 and portion 10b of rod 10.

Figure 1:
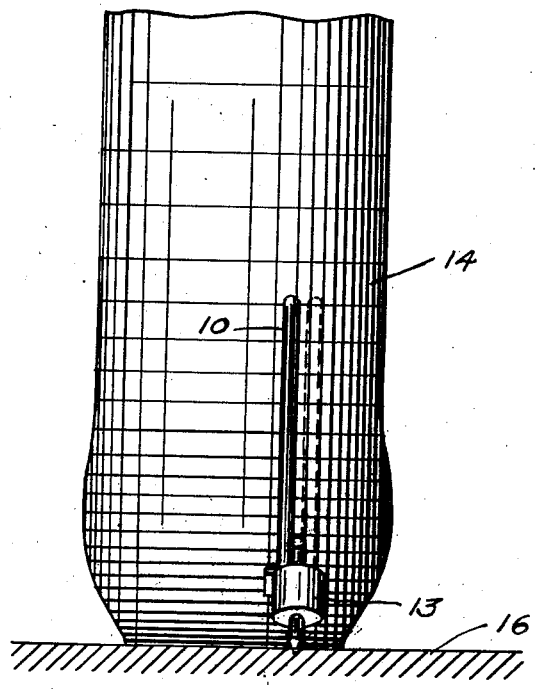
Fig. 1 is a partial rear view of a tire with the hose guide in place.
Figure 2:
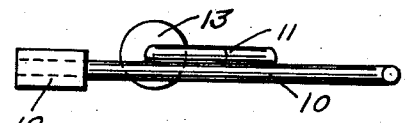
Fig. 2 is a plan view of the hose guide.
Figure 4:
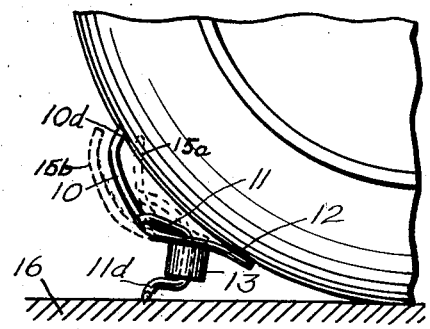
Fig. 4 is a partial side view of a tire with the guide in place.

To apply the device to a tire, the device is first placed under the tire 14 with plate 12 firmly engaging the tire and prong 11d spaced somewhat away from the point of contact between the tire and the pavement or floor 16. The handle 10 may be slightly to one side of the tire tread and end 10d slightly forward of the tread, as indicated by the dotted line 15a in Fig. 4. The handle is then pulled back to the position indicated by the dotted line 15b in Fig. 4, and end 10d swung sidewise to lie in back of the tread. When the handle is released, end 10d tends to dig into the tread at a higher point than plate 12, as shown in Fig. 4. The device thus has a three-point bearing, on the tire and the ground and is wedged in securely. If the device does not seem secure enough when first put in position, it can be easily removed and replaced, with prong 11d somewhat closer to the bottom of the tire, to give a tighter wedging action.

With the guide in position, as shown, a hose or cord dragged around the tire will ride up or down into bracket 11 and slide along roller 13. It is understood that a set of four of these guides are ordinarily used, two facing to the rear on the rear tires, and two facing forward on the front tires. The hose or cord may then be pulled freely all around the car without danger of jamming under the wheels.

It will be noted in Fig. 4, that rod 10 is bent in such a manner that the curved portion 10a is spaced away from the tire. The device is preferably so proportioned with respect to the average tire diameter that a space of about an inch and a half or more is left between portion 10a and the tire so that this portion can be grasped to remove the guide.

These guides will not injure the tire even if the user should forget to remove a guide before driving away, as the guide will fall off easily when the tire rolls away or will tilt on prong 11d if the car moves over the guide.

The guide will hold securely on concrete or pavement or on ground sufficiently hard to provide a good bearing for prong 11d. The guide is quite strong, even though relatively small and light, as leg 11a braces the bend in rod 10. When removed, the guides can be laid flat in a small space, no adjustments are required to adapt the guide for tires of various sizes, as the guide need extend over only a small part of the tread, for example, about eight or nine inches, and substantial variations in tire diameter will not materially affect the spacing of portion 10a from the tread over such a small distance.

What is claimed is:

1. A hose guide, for use on a tire of an automobile standing on a supporting surface, and adapted to be placed between the tread of a tire and the surface in a position to one side of the region of contact of the tire with the surface comprising a bracket having an upright portion and a downwardly projecting prong adapted to engage said surface, a rigid member attached to said bracket, said member having a lower end adapted to engage the tread, between the points of engagement of the prong and region of engagement of the tire with said surface, an upper end adapted to engage the tread at a point disposed further than the prong from said region, and a roller rotatably mounted on said upright portion.

2. A hose guide, for use on a tire of an automobile standing on a supporting surface, and adapted to be placed between the tread of a tire and the surface in a position to one side of the region of contact of the tire with the surface, comprising a U-shaped bracket having an upright leg and an upper and a lower sidewardly extending leg, a prong attached to the lower of said sidewardly extending legs and adapted to engage said surface, a roller rotatably mounted on said upright leg, an elongated member attached to the upper of said sidewardly extending legs, said member having a portion extending in the same direction of said sidewardly extending legs with an upper end adapted to engage the tread of the tire, and a portion extending in the opposite direction, and a plate mounted on the latter portion and adapted to engage flat against the tread.

3. A hose guide as described in claim 2, said member having an intermediate portion so curved as to be spaced away from a tread engaged by said end and said plate.

References Cited in the file of this patent

UNITED STATES PATENTS

| | | |
|---|---|---|
| 2,501,407 | Olsen et al. | Mar. 21, 1950 |
| 2,603,432 | Paulsen | July 15, 1952 |
| 2,618,465 | Austin | Nov. 18, 1952 |
| 2,657,012 | Whitlock | Oct. 27, 1953 |